Jan. 8, 1963 A. B. LINSCOTT ETAL 3,072,365
PILOTLESS CRAFT GUIDANCE METHOD AND MEANS
Filed Sept. 16, 1957 5 Sheets-Sheet 3
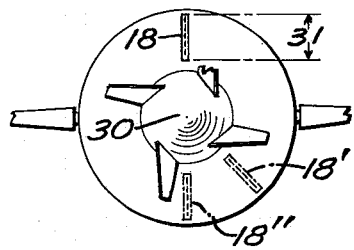
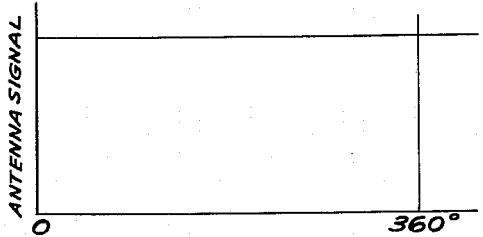
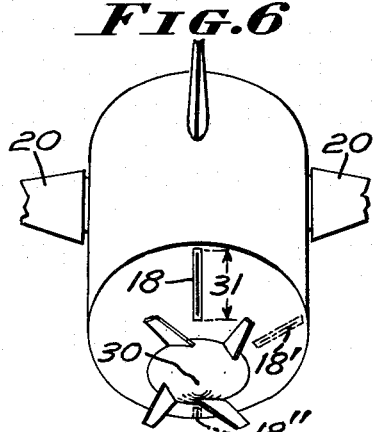
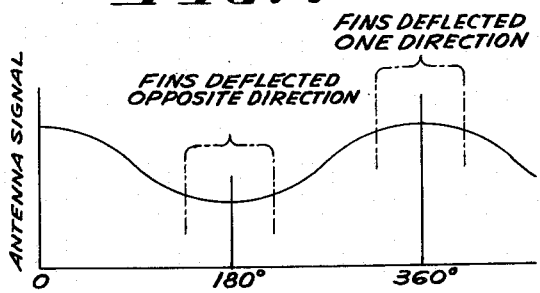
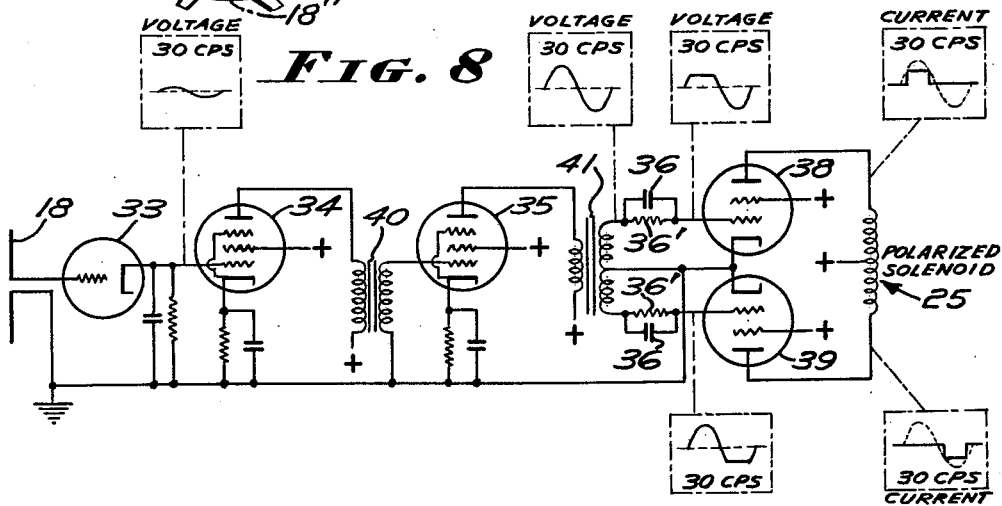
INVENTORS:
AUSTIN B. LINSCOTT, HOWARD D. BELLAMY
and WILLIAM KOBER
BY:
Beau, Brooks, Buckley & Beau,
ATTORNEYS.

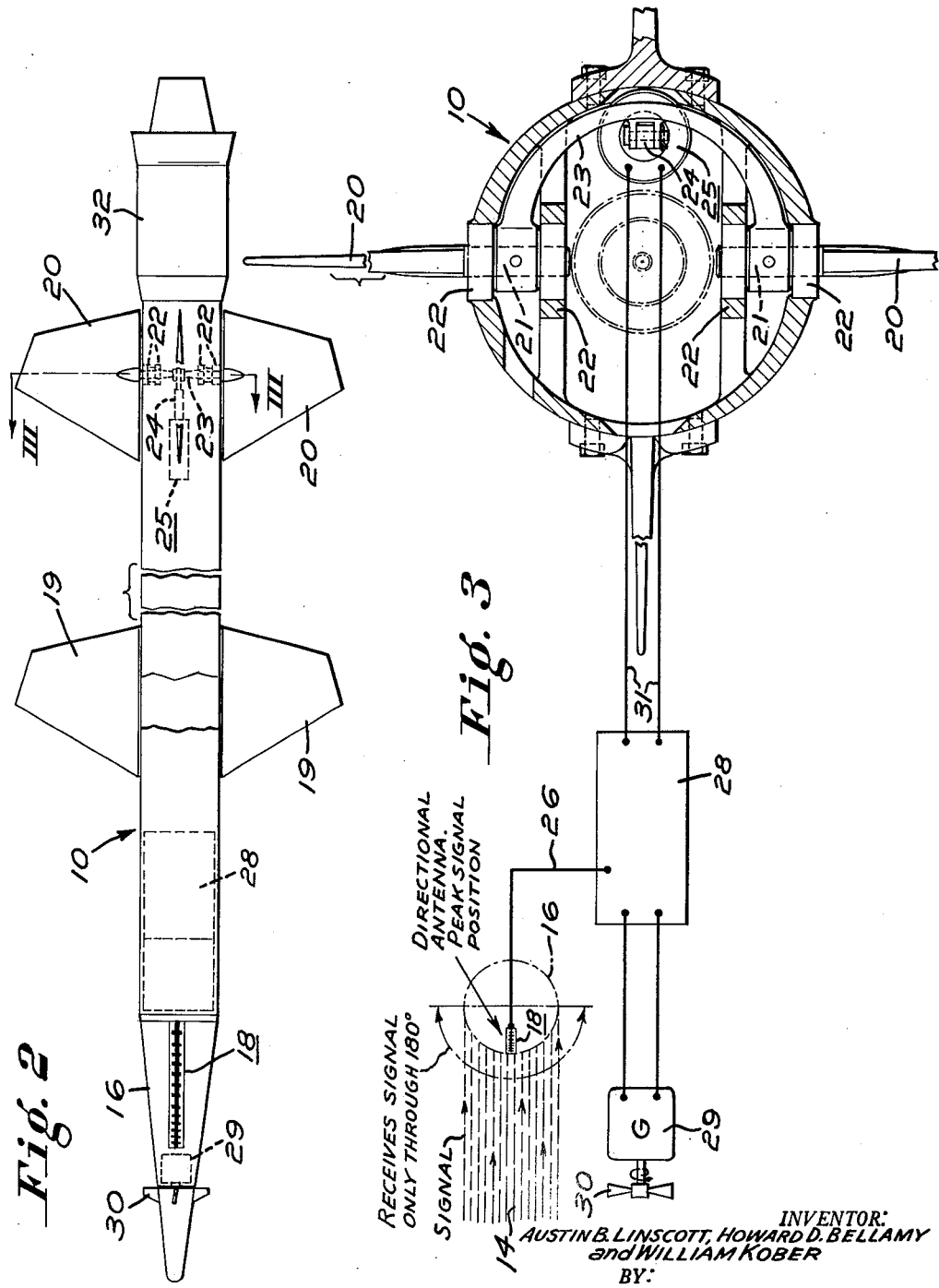

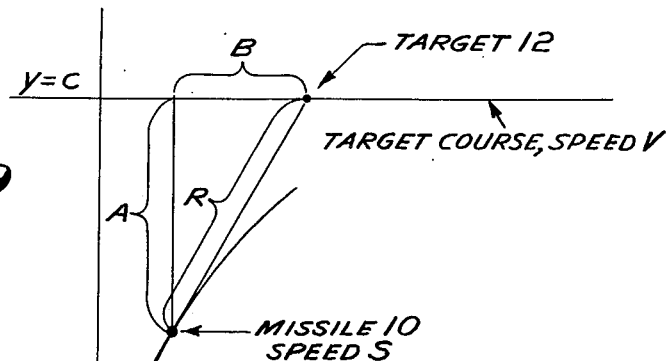
FIG. 9
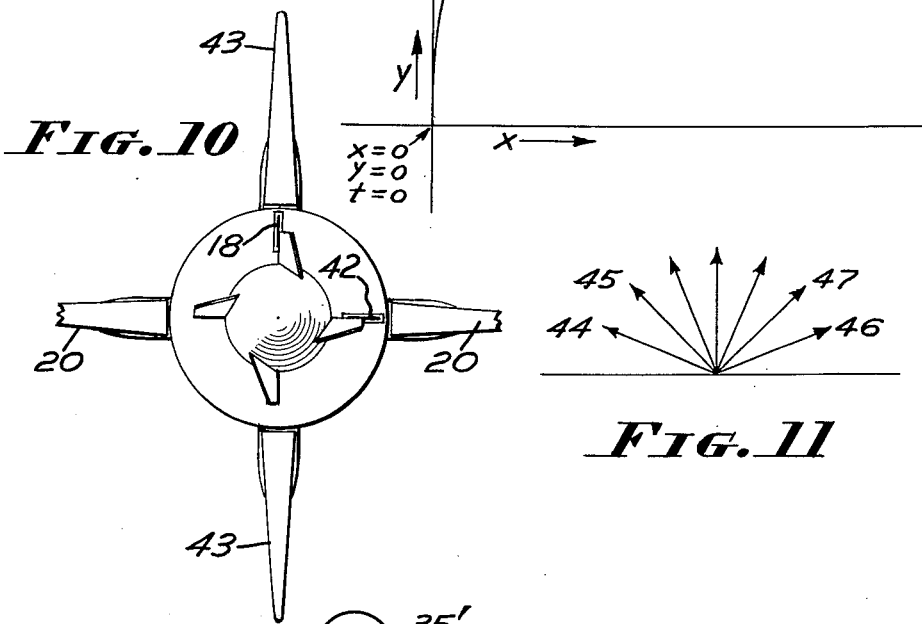
FIG. 10
FIG. 11
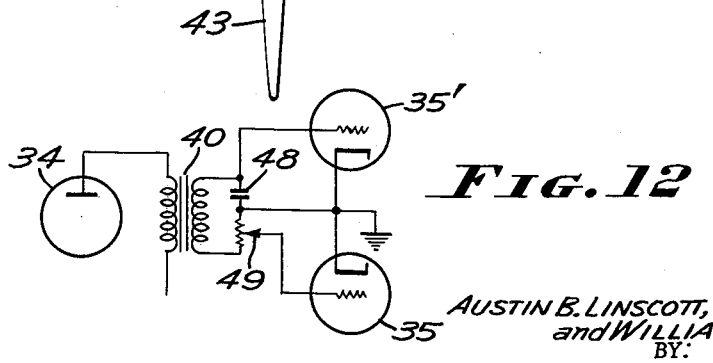
FIG. 12
INVENTORS:
AUSTIN B. LINSCOTT, HOWARD D. BELLAMY
and WILLIAM KOBER
BY:
Beau, Brooks, Buckley & Beau,
ATTORNEYS.

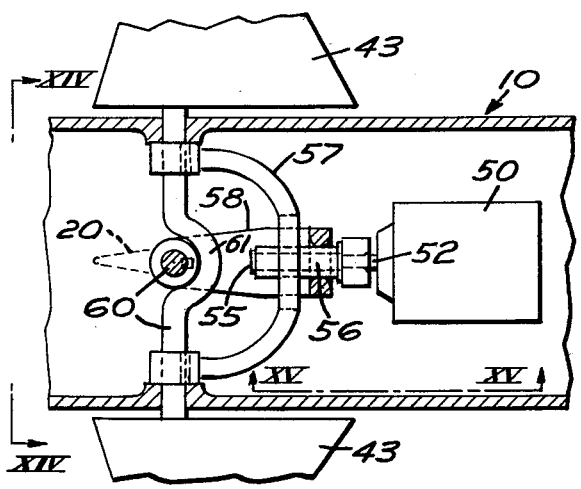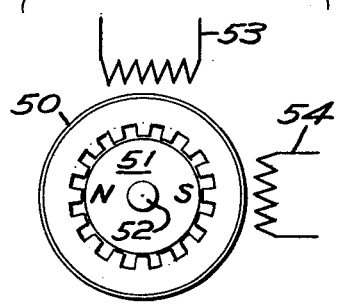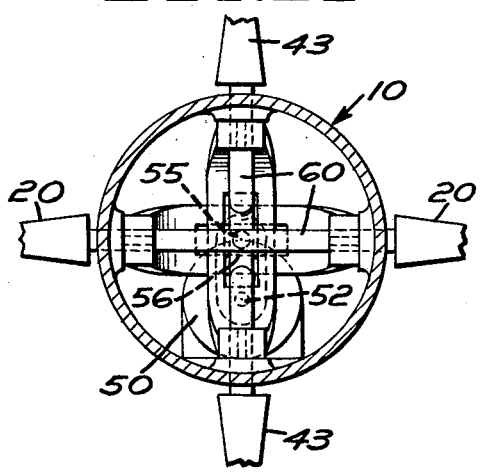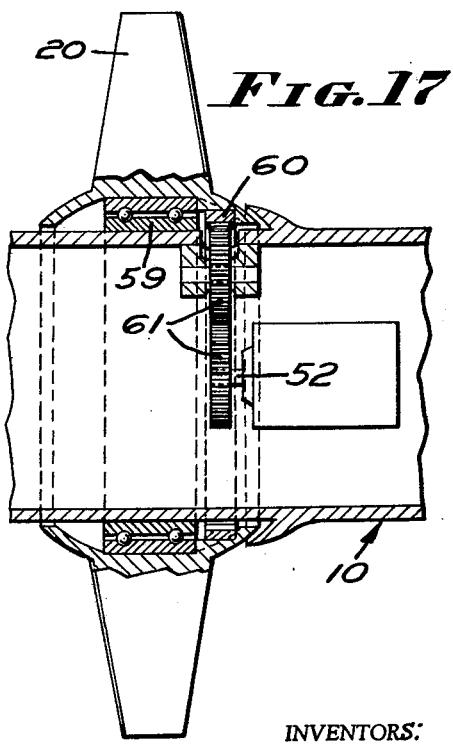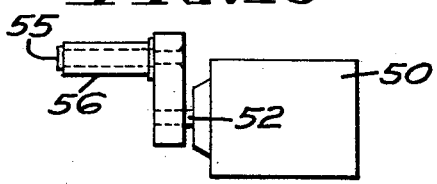

United States Patent Office 3,072,365
Patented Jan. 8, 1963

3,072,365
PILOTLESS CRAFT GUIDANCE METHOD
AND MEANS
Austin B. Linscott, Attica, Howard D. Bellamy, Avon, and William Kober, Fairport, N.Y., assignors to Missile Corporation, Rochester, N.Y.
Filed Sept. 16, 1957, Ser. No. 685,774
10 Claims. (Cl. 244—14)

This application is a continuation-in-part of our pending application Serial No. 354,012, filed May 11, 1953, and now abandoned.

This invention relates to guidance methods and means for pilotless target-seeking ground craft or water craft or aircraft. Thus, whereas the invention is illustrated and described in detail herein as being applied to a target-seeking ground-to-air type missile, it will be appreciated that the method and means of the present invention are equally applicable to any other type target-seeking craft or projectile. Prior type guided missiles and the like have proven the feasibility of employing microwave energy in the form of radio or radar illuminations of an antenna carried by the missile for steering the missile into a collision or "homing" course relative to the chosen target from which the control signal or illumination is caused to emanate. However, the signal-responsive and directional control mechanisms heretofore provided in the guided missile art have invariably possessed certain inherent shortcomings and disadvantages from the standpoint of the complexity of such mechanisms and correspondingly high weight and cost.

It is a primary object of the present invention to provide a radio or radar signal-guided missile of improved form, whereby a simplified signal-responsive guidance mechanism may be employed in conjunction with such missiles in accord with an improved guidance technique.

Another object of the invention is to provide an improved method and means for target-seeking guidance of an aerial missile or the like, whereby the projectile will be guided in stable flight through an optimum trajectory terminating in a collision or near approach relative to the designated target.

Another object of the invention is to provide a missile guidance method and means as aforesaid while greatly simplifying the requisite electro-mechanical structural elements of the signal receiving directional control organization.

Still another object of the invention is to provide an improved missile control means as aforesaid, whereby the need for roll, pitch and yaw stabilizing gyros is eliminated.

Other objects and advantages of the invention will appear from the specification hereinafter.

In the drawing:

FIG. 2 is a side elevational view, with parts broken away, of the aerial missile of FIG. 1, on an enlarged scale;

FIG. 3 is a fragmentary sectional view taken along line III—III of FIG. 2, on an enlarged scale, composited with a diagrammatic illustration of the signal receiving antenna and signal-responsive directional control mechanism of the invention;

FIG. 4 is a generally diagrammatic representation of the missile of FIG. 1, as seen from the target when the missile is pointed directly at the target;

FIG. 5 is a graphical illustration of the signal produced by the missile antenna under the conditions of FIG. 4;

FIG. 6 is a view corresponding to FIG. 4 but with the missile pointing away from the target;

FIG. 7 is a graphical illustration corresponding to FIG. 5, but showing the antenna signal produced under the conditions of FIG. 6;

FIG. 8 is a circuit diagram of an amplifier and associated circuits for use in the guidance system of this invention;

FIG. 9 is a diagrammatic representation illustrating the mode of operation of the missile guidance system of this invention;

FIG. 10 is a generally diagrammatic representation corresponding to FIG. 4 but illustrating a modified steering arrangement;

FIG. 11 is a diagrammatic representation of the steering effort produced by a single set of vanes;

FIG. 12 is a fragmentary circuit diagram similar to FIG. 8 but illustrating a modification;

FIG. 13 is a fragmentary, generally diagrammatic representation of a modified steering vane actuator;

FIGS. 14, 15 and 16 are fragmentary, generally diagrammatic views of the connection between the drive motor of FIG. 13 and the steering vanes; and FIG. 17 is a fragmentary, generally diagrammatic view of a modified connection between the drive motor of FIG. 13 and the steering vanes.

Figure 1:
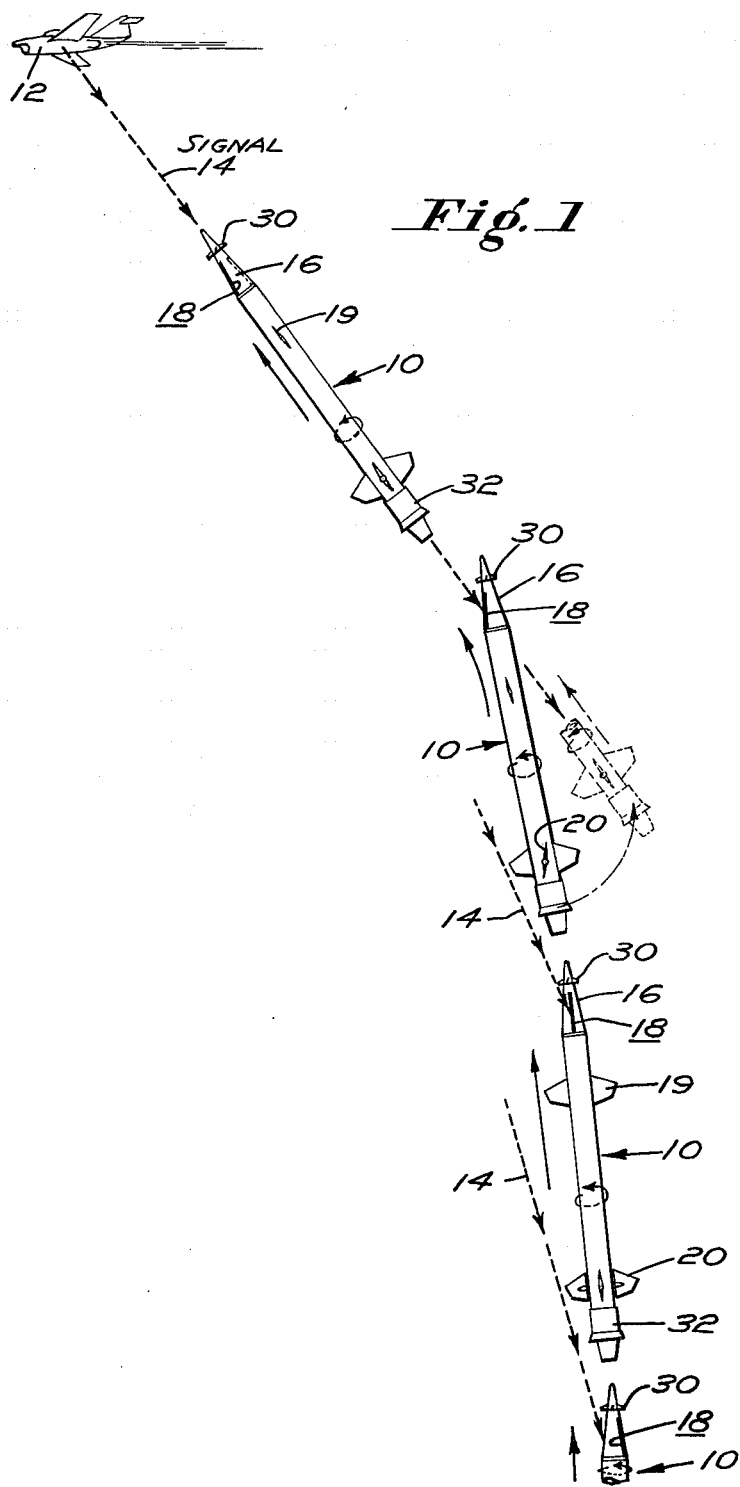
FIG. 1 is a diagrammatic illustration of the operation of an aerial missile equipped with a guidance mechanism and controlled in accord with the method of the present invention.

The invention contemplates essentially the provision of a novel antenna arrangement for receiving a signal reflected or otherwise emanating from the target, such as may be generated in accord with any suitable presently known technique. The receiving antenna in the case of the present invention is located at and confined to only one side of the missile structure and the missile is arranged to be rotated about its longitudinal axis while in flight, so that whenever the missile points away from the target the signal emanating therefrom is intermittently received by the missile antenna, being received only or most strongly as the antenna carrying side of the missile rotates to "face" the target. As the antenna side of the missile rotates away from target-viewing position the signal blanks out with respect to the antenna or reduces to a degree such that the target-facing condition of the antenna may be readily distinguished from any other position thereof by the signal responsive mechanism of the missile. Similarly, whenever the missile is pointed directly at the target the signal emanating therefrom is sufficiently blanked out relative to the missile antenna as to be readily distinguished from the aforesaid target-facing condition by the signal responsive mechanism of the missile.

Thus, whenever the missile is pointed in a direction other than directly at the selected target, the missile antenna will pick up intermittent signals whenever the receiving antenna rotates into target-facing position as the missile rotates about its longitudinal axis thereby providing differential control of the missile flight directional control means and it will be appreciated that the signal responsive output of the antenna may be employed to control operation of the flight-directional controls of the missile in such manner that the longitudinal axis of the missile is brought into alignment with the target.

It will of course be appreciated that the receiving antenna may be of any desired type and coupled by means of any preferred form of signal-amplifying and servo mechanism to the directional control means for the missile which control means in turn may be of any preferred form such as adjustable airstream-responsive rotors or lateral thrust generating jet devices, or the like.

By way of exemplification, one form of the invention is illustrated in the accompanying drawings as being embodied in conjunction with an aerial missile designated generally at 10, which is shown in FIG. 1 as being operated to track down an airplane target as indicated at 12. A radio or radar signal beam emanating from the target 12 is indicated at 14, the emanation having either originated in the target 12 or being reflected therefrom in response to illumination originating in the missile itself or from a ground station or from another aircraft or the like, as the case may be.

As explained hereinabove, the signal receiving antenna of the missile of the present invention is located at one side portion of the missile structure, and whereas the antenna may thus be located at any preferred side portion of the missile structure it may be conveniently disposed in the slightly tapered nose portion 16 of the missile, as shown in FIGS. 1 and 2. Thus, the signal receiving antenna, designated 18 in the drawing, may be mounted within the nose portion 16 of the missile to be either flush or recessed relative to the skin contour thereof, whereby the antenna 18 will be exposed to receive the signal beam 14 for intermittent differential control of the directional control system of the missile, as will be explained more fully hereinafter, only whenever the missile is pointed on a course deviating from a direct aim at the target. To impose a suitable rotating motion upon the missile, any suitable means may be employed such as for example one or more stationary fins, as indicated at 19—19, such fins being generally straight for flight stabilization purposes but slightly twisted so as to impose a slow rolling movement to the missile about its longitudinal axis incidental to forward flight.

The directional control mechanism for the missile may of course be of any preferred form, but as illustrated herein this mechanism comprises a pair of rudder vanes 20—20 spaced longitudinally of the missile structure relative to the fixed wings 19—19. The rudders 20—20 are preferably substantially aerodynamically balanced upon mounting shafts 21—21 carried in suitable bearings 22—22 and connected by means of a horn or yoke 23 (FIG. 3) to one end of a push-pull member 24 which in turn connects to a linear motor device as indicated at 25 (FIG. 2). As shown in FIG. 3, the signal received by the antenna 18 is transmitted by a conductor 26 into any suitable power amplifier mechanism as indicated at 28, and described more fully hereafter, the primary circuits of the amplifier mechanisms being powered from any suitable source, such as for example from a generator designated 29 such as may be conveniently driven by means of an airstream-responsive fan 30. The signal output of the amplifier system may be transmitted as through conductors indicated at 31—31 to the motor device 25, and thus it will be appreciated that the amplifier mechanism may be readily arranged so as to produce a response to an incoming signal from the antenna only when the signal is above a certain fraction of its average value throughout one entire revolution of the antenna 18 toward and away from its target-facing position. At this time the steering rudders will be actuated by the motor 25 in such manner as to tend to steer the vessel back into a course aimed at the target. Thus, it will be appreciated that the steering impulses transmitted through the antenna will be averaged throughout each cycle of rotation of the missile so as to cause the steering rudders to deflect the missile course directly toward the target. In the event any phase delay is encountered in the actual response of the steering rudders to the antenna signal, due to time lags in the electro-mechanical devices, this may be corrected electronically or the angular relation between the steering rudders and the antenna position on the missile may be reset so as to provide the requisite correction for the phase delay.

It may be preferred to arrange for the steering rudders 20—20 to be normally retracted within the missile structure during normal operation thereof, and for automatic projection of the steering rudders into the adjacent air stream at the requisite steering angles whenever the antenna receives a corrective signal.

It is also contemplated to operate the amplifier, etc. and the rudder motor so that the rudder is actuated whenever the signal rises above a fixed base value. The operation will be basically the same, but the rudders will tend to be actuated over nearly 180° of rotation most of the period of guided flight.

It is also contemplated to arrange the controls so that when the signal rises above its fixed base value one set of vanes is actuated, and when the signal is below its fixed base value another set of vanes turned in the opposite sense, is actuated. In FIG. 3, vanes 20 may be deflected in one sense when the signal is above its fixed base, in the other sense when below, as described in greater detail hereafter.

A number of sets of vanes, spaced angularly in rotation, may be used as will be described in greater detail hereinafter. In this form the vanes are actuated by a pulsing circuit in phase sequence so that a continuous steering impulse is provided. The pulsing circuit is synchronized by the incoming signal from the antenna, so that the steering is always toward the target.

Instead of vanes, timed jets, which may be explosions ignited by a spark under control of the actuating circuit, may be used for steering.

For a better understanding of the invention, it is necessary to analyze the operation of the missile seeking and steering apparatus in more detail.

In the general case of the missile in directed flight, the axis of the substantially cylindrical missile 10 of FIG. 1 is not in line with the target. A geometrical plane, defined as that plane containing the axis line of missile 10 and the center of target 12, considered a point, is used for reference and will hereafter be called the basic plane. It will in general shift its position with respect to the earth's surface, unless the target travels in a straight line or a curve always contained in the original location of the plane. Changes in orientation of the plane are of no importance to the problem of guidance, which can now be stated as follows:

(1) To home on the target according to the invention, the missile must always steer so as to point at the target, and this can be done by steering it with steering forces whose vectors always lie in the basic plane.

(2) The guidance system then has two necessary factors: One—determination of the basic plane, and two—application of steering forces in the proper direction and in this plane.

The missile is rotating about its longitudinal or spin axis at a convenient speed such as, for purposes of illustration, 30 revolutions per second. In reference to FIG. 1, the plane of the paper is the basic plane. The antenna 18 is mounted substantially as an element on the conical nose 16. FIG. 4 shows the view from target 12, or along line 14 of FIG. 1, of the antenna in the nose when the missile spin axis is exactly in line with line 14, or pointed directly at the target. The projected length 31 of the antenna is the same for any angular position of the missile, as shown at 18' and 18". The signal energy picked up by the antenna will, therefore, remain constant, as indicated in FIG. 5 where position 18 of the antenna is taken as zero.

In FIG. 6 the general condition, where the missile spin axis is not in line with target line 14, is shown. Here, line 14 is perpendicular to the plane of the paper, and the missile axis is inclined with its base upward in the plane of the paper. In position 18, the antenna projection is shown by 31', but in other angular positions as at 18" and 18" it has smaller projections. The antenna is designed so that the signal it produces is substantially proportional to the projection of its length on the transverse E vector of the electromagnetic wave emanating from the target vertically above the paper over the nose 16; and in fact this is a natural characteristic of almost all antenna types. Thus, the antenna signal is substantially proportional to the length 31 of antenna 18 as shown in the projection view of FIG. 6. FIG. 7 shows the relation of antenna signal to angular position of missile 10 as the missile spins.

It is obvious that the maximum signal occurs when the antenna 18 is in the basic plane, and on the side toward which the target deviates from the missile spin axis. In FIG. 6, of course, the basic plane is perpendicular to the plane of the paper and cuts the paper in a vertical line.

With antenna 18 at angle zero as shown, if fins 20 are deflected to turn the missile axis toward the vertical (or toward line 14) it is seen that the missile will steer to line up its spin axis with the target. Fins 20 preferably should be set in this position for an approximately equal time before and after the antenna is at zero angular position, as shown in FIG. 7 between the dotted lines, and set in the opposite position for about the same range around the 180° position.

It is important to note that the steering effort need not be proportional to the deviation of the target from the missile axis. Though the range of signal amplitude shown in FIG. 7 furnishes a basis for such proportional control, it is possible to turn vanes 20 to a maximum position regardless of this amplitude range. Then the missile will steer at maximum acceleration until the signal variation drops below the sensitivity level of the amplifier driving the solenoids 25 (FIG. 3), when all steering effort ceases until a sufficient difference of level is again built up.

FIG. 8 shows a simple form of a demodulator, amplifier, level detector and power stage as an illustration of how the vanes 20 may be operated as described in FIG. 7. The antenna 18 is shown as a dipole for simplicity in illustration. As the target is usually in clear signal view of the missile and not distant for signalling equipment, a high frequency diode 33 may be used directly from the antenna to eliminate problems of amplification at X band frequencies, which are of the order of 5 cm. wavelength. If necessary, however a klystron or electron multiplier able to handle the radio frequency may be used. Also desirable when weak signals must be handled is a frequency converter or superheterodyne system, which requires no comment since it is very commonly used in similar equipment.

The input to the grid of tube 34 is now at the rotational frequency of the missile spin, or about 30 cycles per second in the chosen example, and with an amplitude-angle relation as in FIG. 7, and is readily handled by conventional low frequency amplifier technique. The wave at transformer 41 is also substantially that of FIG. 7, but is now of sufficient amplitude to drive the grid of tube 38 well into the positive when the missile axis is only slightly inclined to the line 14 of the target. The grid bias circuit consisting of condenser 36 and resistor 36' produces a high plate current in tube 38 for a period somewhat less than one-half of the input wave, the period of conduction depending on the choice of condenser and resistor values in the well known manner of operation of this familiar circuit. The period depends to a minor degree on the strength of the signal, but as previously described this is not necessary. On the other hand, it is not undesirable. More complex circuits which will give any desired degree of control of the solenoid actuating current will be readily found in the art. Tube 39, operating at phase opposition through transformer 41, works in exactly the same way as tube 38 but is connected to a second winding in solenoid 25, so that this polarized solenoid will drive vanes 20 into reverse steering action when the missile spin position is in the neighborhood of 180°. When the solenoid is polarized and the vane works to both sides of neutral, the average steering force over a full rotation of the missile is naturally twice as great. This is of great advantage in the performance of the missile, as will be explained.

The missile propulsion system gives it a normal speed of about 3 or 4 Mach, which is developed rapidly in the early stages of acceleration. For airplane targets, this gives the missile a large speed advantage, and it is easily seen how the described guidance system, which always directs the missile toward the target, will result in a direct overtaking collision, if the missile is launched at a point substantially behind the target.

Where the missile is launched at a point substantially ahead of the target's path, the course to collision is equally obvious, and in this case the missile need not have a speed even as great as that of the target. In fact, for a target faster than the missile, there is always a cone in the front of the target, along its trajectory, in which the missile may be launched and accomplish interception. The angle of the cone gets smaller as the ratio of target speed to missile speed increases more and more above the value 1. Thus the missile of this invention, when launched under proper conditions, is capable of intercepting targets moving at velocities of the order of elliptical and even hyperbolic orbits in the earth's field, as they approach the earth's surface.

In the above special cases, the major performance factor of the missile is its speed. In general, however, against targets both faster and slower than the missile, its ability to change course, or accelerate rapidly enough to always point at the target, is its principal performance test and a measure of the closeness to which it can approach the target.

The missile of the invention is unusual in using a guidance system in which the missile always points at the target. Other missiles attempt to aim toward a predicted collision point, which of course changes its position with each change of course of the target. Such a system requires extremely complex and elaborate equipment, and each mechanism has shortcomings for some types of evasive action, which it is impossible to discuss here. That type of guidance will hereafter be referred to as collision-course guidance. The missile of the invention, always pointing and moving directly toward the instantaneous actual position of the target, will be described as having target-homing guidance.

The target-homing system is unique in that evasive action of the target is either useless or worse than useless. No predicted collision point exists to be changed by evasive action, and in general any irregular course will create a situation more favorable for interception by the missile.

However, in some cases the target-homing system is theoretically incapable of hitting the target center. In such cases, the closeness of approach is determined by the power of the missile to develop steering acceleration of large magnitude. An important part of the invention is the creation of a guidance system capable of applying such great steering forces.

For an understanding of the importance of steering acceleration, a mathematical study of one of the most unfavorable conditions of target course, where the missile is at one point directed at right angles to the target course and the target is moving much more slowly than the missile in a straight line, is very useful.

FIG. 9 shows this special case. The basic plane is the plane of the paper, and need not be vertical or have any other special orientation. The target is moving a $y=c$ in a straight line at velocity $v$. At the instant the target was at $x=0$, the missile was at $x=0$, $y=j0$ and directed vertically along the $y$ axis. The origin of coordinates $x=0$, $y=0$ need not be the launching point, but can be any moment when the missile is directed at right angles to the course of the target.

From FIG. 9, because the missile at any instant is directed at the target, (1) $$\frac{dy}{dx}=\frac{A}{B}=\frac{c-y}{vt-x}=\frac{y-c}{x-vt}$$

(2) $$\frac{d^2y}{dx^2}=\frac{\frac{dy}{dx}}{x-vt}-\frac{(y-c)}{(x-vt)^2}\left(1-v\frac{dt}{dx}\right)$$

(3) $$\frac{d^2y}{dx^2} = \frac{v - \frac{dx}{dt} \cdot \frac{dy}{dx}}{x - vt}$$

This can be simplified as follows:
Let
$S_x$ = the X component of the missile velocity S
$S_y$ = the Y component of the missile velocity S (4) $$S_x^2 + S_y^2 = S^2$$

(5) $$1 + \frac{S_y^2}{S_x^2} = \frac{S^2}{S_x^2} = 1 + \frac{(dy)^2}{(dx)^2}$$

(6) $$\frac{1}{S_x} = \frac{1}{S}\sqrt{1 + \frac{(dy)^2}{(dx)^2}}$$

(7) $$\frac{d^2y}{dx^2} = \frac{\frac{v}{S} \cdot \frac{dy}{dx}\sqrt{1 + \frac{(dy)^2}{(dx)^2}}}{x - vt}$$

The curvature of the missile path, which governs steering acceleration, is (8) $$\frac{\frac{d^2y}{dx^2}}{\left(1 + \frac{(dy)^2}{(dx)^2}\right)^{3/2}}$$

(9) Curvature of missile path $= \dfrac{\frac{v}{S} \cdot \frac{dy}{dx}}{(x-vt)\left(1 + \frac{(dy)^2}{(dx)^2}\right)}$ The turning acceleration is, as is well known, the curvature times the square of the missile speed, or

(10) $$\text{acceleration} = \frac{vS \cdot \frac{dy}{dx}}{x - vt \left(1 + \frac{(dy)^2}{(dx)^2}\right)}$$

(11) $$= \frac{vS}{R\sqrt{1 + \frac{(dx)^2}{(dy)^2}}}$$

Since $B = x - vt$ and $R = B\sqrt{1 + \frac{(dy)^2}{(dx)^2}}$

Equation 11 is in terms of:
$v$ = the target speed
$S$ = the missile speed
$R$ = instantaneous distance between target and missile
$dx/dy$ = the inverse of the slope of the missile trajectory In the early stages of the trajectory, $dy/dx$ is large and $dx/dy$ is small, and R is of course large. The acceleration is small. In the intermediate stages, the acceleration continues small. As R drops rapidly near the collision point, $dx/dy$ however becomes large.

In this region, Equation 11 is very nearly accurate in the following form:

(12) $$\text{Steering acceleration} = \frac{vS}{R\frac{(dx)}{(dy)}}$$

The error in the above is that it is slightly higher than the exact figure for acceleration. Thus, as R decreases, $dx/dy$ increases, and to a large extent neutralizes the approach to high values of acceleration. As a matter of interest, note the similarly of Equations 11 and 12 to the familiar expression for acceleration in a circular path $V^2/r$.

As the missile comes very close to the target, it may reach its limit of acceleration and it will then pass behind the target center. Specific calculations show that if the maximum steering acceleration is about 50g, the missile will pass by the target center at a distance of the order of 30 feet when the missile speed is 3000 ft./sec. and the target speed 800 ft./sec. depending of course also on the other factors. It should always be remembered that the case analyzed is one of the most unfavorable types of missile approach to target.

To summarize the above path analysis, it may be stated that the missile, in spite of its mechanically simple guidance system, has excellent interception characteristics, even under the most unfavorable conditions. Evasion attempts on the part of the target are uniquely ineffective.

In addition, the above performance is based on objective data directly, without error produced by collision point predicting formulae, and instrument limitations, such as gyro drift do not enter, as no independent orientation system is needed, and none of the equipment used is complex or delicate.

The above mathematical analysis refutes an opinion widely held in the art, that the target-homing guidance system is not efficient for the interception of moving targets. With the above study as a guide, the missile can be developed to have characteristics and functions suited to develop the excellent potential of this system for following not only moving, but evading targets.

One method of the invention for overcoming the possible deviation from central collision is to use a proximity fuse, separate from any of the other circuits, which, on approach to a certain distance from the target, will detonate the remaining fuel (preferably including hydrazine), thus fragmenting the entire missile. The resulting shrapnel will spread in a cone. The missile will normally cruise at about 4 Mach or 3000 feet per second, and the fragments of the missile will be exploded at speeds up to about 400 ft. per second, so that the cone will cover points up to about 8° on either side of the last directed course of the missile. The shrapnel, overtaking a target flying below the speed of sound, will have a large relative velocity, and be highly destructive.

The steering effort of the guidance system can be approximately doubled, and the steering acceleration doubled in consequence, by the following modification. FIG. 10 shows a front view of the modified missile. Antenna 18 and steering vanes 20 are the same as in FIGS. 1, 2 and 3. In addition, there are provided antenna 42 and steering vanes 43, displaced 90° from antenna 18 and steering vanes 20, respectively, and having identical properties therewith. The second set of antenna and vanes provides a steering force about the axis at right angles to the axis on which vanes 20 operate. The result is to double the steering force, as will now be proven.

With a single set of vanes 20, even if they are actuated one way for 180°, and the other way for the remaining 180°, a steering effort on only one axis is developed. FIG. 11 shows the vector steering effort of a set of vanes fully deflected over 180° of rotation. The horizontal component of any vector such as 44 is balanced by a corresponding vector 46, and only the vertical component is non-neutralizing. The same is true of the reverse action for the other 180°. Another way of stating this is that the steering vanes are fully effective only when they are deflected in an axis at right angles to the basic plane. At other times, part of the steering force is effective, the other part is in the other axis and is balanced out.

The above analysis will also clarify why the preferred period of vane deflection is less than 180°, because such vectors as 44 and 46 contribute little useful or vertical component in FIG. 11, but do create an increased drag when deflected. Thus, about 120°, or 60° on each side of the vertical produces nearly as much steering action and almost ⅓ less drag (60° of 180° at low drag).

When the second set of vanes 43 is added, an amount of steering effort equal to that produced by the first set is added. At the same time, a smoother turning effort is provided, with less lateral force producing wobble of the missile. A substantially uniform steering force is provided by the two sets of vanes over quite a range of deflection period, so that the action of the two sets may overlap or be separated by a time when all vanes are neutral.

The best steering effort results from about a 120° period for each set of vanes, but the best ratio of steering effort to drag results when there is some interval with all vanes neutral.

The extra antenna 42 providing the 90° phase difference between vane groups is not necessary. In the circuit of FIG. 8, the output of tube 34 can be split into two components very nearly 90° apart by placing condenser 48 and resistor 49 in the secondary of the output transformer 40 of this tube, as illustrated in FIG. 12. Condenser 48 is chosen to have a reactance at the approximately 30 cycle frequency that is lower than the resistance of resistor 49. The resistor is tapped by a ratio point shown by the arrow so that the voltages are approximately equal at the grids of tubes 35 and 35'. Tube 35 is the in-phase amplifier, which continues as in FIG. 8 to the solenoid 25 actuating vanes 20. Tube 35', which has a supply very nearly 90° out of phase with tube 35, is the start of a new amplifier identical in design with the system as in FIG. 8, but leading to an out-phase solenoid driving the actuating vanes 43. In regard to condenser 48 and resistor 49, if the spin frequency of the missile changes, the voltage ratio going into the two branches 35 and 35' will become unequal, but the phase relaton will remain correct. As before noted, the circuit is not sensitive to voltage level as respects operation. In this connection, it may be stated that the missile spin may preferably be produced by a special set of spin vanes controlled in pitch by a centrifugal governor so that a relatively uniform spin frequency results, though it will be noted that such uniformity is not necessary to operation. There are, of course, circuits available in the art that will give a 90° deviation with constant amplitude over a wide frequency range, but as above noted they are not necessary for operation of the invention. The two antenna system shown also has this property.

It will now be obvious that, in a similar way, by adding antenna or phase splitters, and by adding vanes at the corresponding position, a three or more phase vane system, with 6 or more vanes, is also available. At some cost in complexity, these polyphase systems produce a reduced ratio of steering effort to drag.

With the two-phase system, either with or without a second antenna, a different type of vane actuator becomes possible. In FIG. 13, a two-phase wound motor 50 with a permanent magnet field is shown. This motor has one phase of its winding, shown schematically at 53 connected to the amplifier train of tube 35, and the other phase thereof, indicated at 54, to that of tube 35'. In this form, the output group 38, 39 of the amplifier of FIG. 8 is eliminated, and a normal linear push pull amplifier, such as a standard class B or C type is substituted therefor to feed the motor winding. The motor rotor 51 is also equipped with pole face dampers to permit it to run up to synchronous speed at the start.

In operation, the motor shaft 52 will rotate oppositely to the missile spin, and in fact, there is an angular point in the shaft which will always lie in the basic plane.

FIGS. 14–16 show one way in which the motor 50 of FIG. 13 can operate vanes 20 and 43. The shafts 60 between the vanes are curved to clear each other, as indicated at 61, and each shaft has a fork 57, 58 which engages block 56 mounted on a crank 55 on shaft 52 of the motor. Other methods of linkage are, of course, available, but this device has a short working life and design to minimize wear is not important. Block 56 may be square or round. If round, it will roll on alternate sides of the forks 57, 58 and so reduce friction.

It is also possible to have the shaft of the motor drive a rotating collar on the outside of the missile in a 1 to 1 ratio. A pair only of vanes, on opposite sides, and permanently angled will then provide the steering action. FIG. 17 shows a bearing 59 on which the vanes rotate, the vane mount having a geared portion 60 driven by a gear train 61 from the motor shaft 52. The details of the gear train are not shown, as no special problem is encountered, and conventional gear applications only are required, such as to give an exact 1 to 1 ratio between the rotational speed of the vanes about bearing 59 and the motor shaft 52.

The above system will have no region of no steering action, even when the missile is directly in line with the target. The missile will therefore undulate about the proper line. Because the vanes are in fixed position, however, they can be made more aerodynamically efficient.

Another method of the invention to increase acceleration as the missile nears the target is to have an auxiliary solid or liquid fuel lateral jet system, under the same control as the vanes, which will add to the steering effort in the last several thousand feet of separation. The proximity fuse system used to detonate the missile may have a first stage approach to activate this and a second stage for the detonation itself.

The proper tactics of use of the missile will help to increase its efficiency even further. Thus, launching when the target is overhead is not the best time; much to be preferred with slot targets is a launching when the target is well past this overhead point. Such a delayed launching is also obviously more convenient from the point of view of detection of the target and execution of the launching.

If the target is only somewhat slower than the missile, launching when the target is overhead is less disadvantageous, as the pursuit curve of the missile will give a substantially following course as contact is approached. When this moderate difference in speeds exists, R decreases quite slowly as the missile swings toward the target in the final stages, giving a much longer time to execute the required change of path, and all the while $dx/dy$ is increasing. This is the reason why the case of the much slower target, FIG. 9, is one of the most disadvantageous special cases.

Also helpful is a relatively long range of target interception. Thus, a high altitude target is well handled. The low altitude target is equally well handled as explained above, by launching after the target has passed the zenith.

For very fast targets, the earliest launching possible is the best. Such targets must come in at a high angle above the horizon, because they cannot maintain such speeds in dense atmosphere, and this is the most important condition permitting early launching of the missile.

One other factor requires some comment:

The target should be at a fairly high angle above the horizon when the missile is launched, to permit clean fixing of the guidance system on the target.

In the above, the missile speed has been given 3 to 4 M. It is understood that propulsion systems giving speeds lower than this are always available, and for some special types of targets would be preferable according to the detailed consideration of interception paths given above. At the present time, higher speeds are not attainable within practical limits of cost and material, but it is noted that for very fast targets, the highest possible speed is called for.

The propulsion mechanism for the missile may of course be of any desired type and form, having nothing to do with the present invention. For example, the missile may be powered by means of a jet motor device such as is indicated generally at 32. Also, any suitable means may be employed for preventing the missile from heading toward the original source of the radio or radar illumination if this is anything other than the selected target. Also, any suitable means may be employed for detonating the war charge of the missile when it reaches the target, such as a suitable contact or proximity fuse or the like, as may be preferred.

It will be appreciated that by virtue of the arrangement of the present invention the antenna and connected rudder control system will operate automatically and continuously to cause the missile to maintain stability in flight along a constantly corrected trajectory terminating in a collision with a selected target, any deviations of the missile from the indicated course being automatically damped out by reason of the continuously automatic operation of the novel signal-sensing and rudder control arrangement of the present invention.

Thus, although only certain forms of the invention are illustrated herein, it will be appreciated that the instant invention is not limited thereto and comprehends modifications thereof and other forms such as fall within the scope of the appended claims or the skill of the art.

Having fully disclosed and completely described our invention and its mode of operation, what we claim is:

1. In a missile adapted to be guided toward a target automatically in response to a signal received from the target, a missile body, means for producing a slow rotation of said body about its longitudinal axis while in flight, flight direction control means carried by said missile body, and actuating means for said flight direction control means including target signal responsive antenna means carried by the body for variable exposure to the target when the longitudinal axis of said body is disposed out of alignment therewith, said actuating means being operable to actuate said flight direction control means in one sense when said antenna means faces toward the target and in the opposite sense when said antenna means faces away from the target.

2. The combination set forth in claim 1, wherein said actuating means actuate said flight direction control means for maximum steering effect throughout substantially the entire period of operation thereof.

3. The combination set forth in claim 1, wherein said flight direction control means are actuated in each sense for substantially less than one-half of a revolution of said missile body.

4. In a missile adapted to be guided toward a target automatically in response to a signal received from the target, a missile body, means for producing a slow rotation of said missile body about its longitudinal axis while in flight, first flight direction control means carried by said missile body, second flight control means carried by said missile body in angularly displaced relation to said first control means, and means for actuating said first and second control means in proper phase relation as said body rotates including target signal responsive antenna means carried by said missile body for variable exposure to the target when said body is out of longitudinal alinement therewith.

5. The combination of claim 4, wherein said actuating means includes first and second antenna means angularly displaced to operate said first and second control means in proper phase.

6. The combination of claim 4, wherein said actuating means includes antenna means common to said first and second control means, and phase splitting antenna signal responsive means for actuating said control means in proper phase relation.

7. In a missile adapted to be guided toward a target automatically in response to a signal received from the target, a missile body, means for producing a slow rotation of said missile body about its longitudinal axis in flight, multiple flight direction control means carried by said body in angularly displaced relation for polyphase steering control thereof, and means for actuating said flight control means in proper phase relation including antenna means carried by said body for variable exposure to the target when said body is out of longitudinal alignment therewith.

8. The combination of claim 7, wherein said control means comprise multiple members movable relative to said body, a motor having a drive shaft lying substantially along the longitudinal axis of said body, and means connecting said control members to said drive shaft for actuation thereby.

9. The combination of claim 7, wherein said control means comprise members movable relative to said body and to each other about axes angularly displaced from each other about the longitudinal axis of said body.

10. In a missile adapted to be guided toward a target automatically in response to a signal received from the target, a missile body, means for producing rotation of said body about its longitudinal axis in flight, flight control means comprising steering members mounted on said body for rotation thereto about the longitudinal axis thereof, and means for variably rotating said steering members about said axis relative to said missile body, said last-named means including antenna means carried by said body for rotation therewith, said antenna means being focussed outwardly from one side only of said body for variable exposure to the target when the longitudinal axis of said body is out of alinement therewith.

References Cited in the file of this patent

UNITED STATES PATENTS

| 2,415,348 | Haigney | Feb. 4, 1947 |
| 2,421,085 | Rylsky | May 27, 1947 |
| 2,517,702 | Offner | Aug. 8, 1950 |
| 2,520,433 | Robinson | Aug. 29, 1950 |
| 2,557,401 | Agins | June 19, 1951 |
| 2,659,004 | Lindenblad | Nov. 10, 1953 |

FOREIGN PATENTS

| 832,427 | France | July 4, 1938 |
| 582,482 | Great Britain | Nov. 19, 1946 |

OTHER REFERENCES

Guidance, Merril (Editor); 1955, Van Nostrand Co., pp. 459–468.

Electronics, Aug. 1, 1957, pp. 7–8.